(12) United States Patent
Dalluge et al.

(10) Patent No.: US 8,281,798 B2
(45) Date of Patent: Oct. 9, 2012

(54) BALL VALVE SEAL ASSEMBLY AND BALL VALVE COMPRISING SAME

(75) Inventors: Paul Russell Dalluge, Marshalltown, IA (US); Lonnie Oscar Davies, Jr., Newton, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 348 days.

(21) Appl. No.: 12/771,165

(22) Filed: Apr. 30, 2010

(65) Prior Publication Data

US 2011/0265886 A1      Nov. 3, 2011

(51) Int. Cl.
*F16K 5/20*      (2006.01)

(52) U.S. Cl. ............... 137/15.22; 251/315.1; 251/316; 251/361

(58) Field of Classification Search ............... 251/314, 251/316–317, 360–361, 315.01, 315.1; 137/15.17, 137/15.22, 15.09
See application file for complete search history.

(56) References Cited

U.S. PATENT DOCUMENTS

| 4,082,246 A | * | 4/1978 | Rothwell | 251/307 |
| 4,220,172 A | * | 9/1980 | Stager | 137/74 |
| 4,231,546 A | * | 11/1980 | Eggleston et al. | 251/173 |
| 4,241,895 A | * | 12/1980 | Sternenberg et al. | 251/173 |
| 4,398,695 A | * | 8/1983 | Torche | 251/306 |
| 4,398,696 A | * | 8/1983 | Szilagyi et al. | 251/307 |
| 4,898,363 A | | 2/1990 | Burton | |
| 5,069,240 A | | 12/1991 | Kurkjian, Jr. | |

FOREIGN PATENT DOCUMENTS

| GB | 2206952 A | 1/1989 |
| WO | WO-2009/008061 A1 | 1/2009 |

OTHER PUBLICATIONS

International Search Report for PCT/US2011/032914 dated Jun. 21, 2011.
Written Opinion for PCT/US2011/032914 dated Jun. 21, 2011.

* cited by examiner

*Primary Examiner* — John Bastianelli
(74) *Attorney, Agent, or Firm* — Marshall, Gerstein & Borun LLP

(57) ABSTRACT

A seal assembly in a rotary ball valve is installable and replaceable through a bonnet opening in a valve body of the rotary ball valve. The seal assembly includes an anchor ring located in an internal recess in the valve body and one or more seal assembly components, such as a flexible seal member, a seal carrier, a seal retainer, and a rigid seal ring, are secured to the anchor ring.

20 Claims, 9 Drawing Sheets

BALL VALVE SEAL ASSEMBLY AND BALL VALVE COMPRISING SAME

FIELD OF THE DISCLOSURE

The present disclosure relates to fluid control devices and, more particularly, to rotary ball-type fluid control valves and seals for rotary ball-type fluid control valves.

BACKGROUND

Rotary ball valves are used in a wide number of process control system applications to control some parameters of a process fluid such as a liquid, gas, slurry, etc. While the process control system may use a control valve to ultimately control the pressure, level, pH, or other desired parameter of a fluid, the control valve basically controls the rate of fluid flow.

Typically, a rotary ball valve includes a valve body defining a fluid inlet and a fluid outlet. A ball element is mounted in the valve body and rotates about a fixed axis into and out of abutment with a seal assembly, thereby controlling the amount of fluid flow through the valve. With typical bolted in-line ball valves, the seal assembly is inserted into the valve body through the fluid inlet, and retained adjacent to a flange on the outside of the valve body with a seal protector ring. After the seal assembly is inserted through the fluid inlet and retained by the seal protector ring, a section of fluid pipeline is attached to the fluid inlet.

In most applications, when the seal assembly needs to be changed, the section of pipeline attached to the fluid inlet is removed first, exposing the seal protector ring. After the seal protector ring is removed, the seal assembly may be replaced. Thus, the seal assembly is removable and replaceable from outside the valve body.

Rotary ball valve components, including the valve body, the ball element, and the seal assembly, are typically constructed of metal. This stands especially true when used in high pressure and/or high temperature applications. However, the ball element and seal assembly can suffer wear due to the repeated engagement of the ball element and seal assembly during opening and closing of the valve. The problems resulting from the wear include, but are not limited to, diminished life span of the valve components, increased frictional forces between the ball element and the seal assembly, and undesirable leakage between the ball element and the seal assembly, as well as between the seal assembly and the valve body. Similarly, because the frictional forces tend to increase as the components become more worn, the dynamic performance and control characteristics within the valve are worsened, resulting in inefficiencies and inaccuracies in the valve. To alleviate some of these concerns, some seal assemblies are biased such as to provide a more reliable seal against the ball in the closed position.

SUMMARY

A seal assembly for a rotary ball valve includes an anchor ring with a bore. The anchor ring is located in an internal recess in a valve body of the rotary ball valve. Additional seal assembly components are attached to the anchor ring. In one embodiment, a flexible seal member is attached to the anchor ring with one or more captive screws that extend through one or more threaded openings in the flexible seal member and into one or more bores in the anchor ring. In another embodiment, a seal carrier is attached to the anchor ring with one or more captive screws that extend through one or more threaded openings in the seal carrier and into one or more bores in the anchor ring. Additional seal elements, such as a seal retainer and a rigid seal ring, may be subsequently attached to the seal carrier. The seal assembly is installable and replaceable by inserting components of the seal assembly through a bonnet opening in the valve body. As a result, fluid pipeline sections attached to the valve body need not be removed from the valve body. Thus, the seal assembly may advantageously be installed in systems having very stringent leak standards, such as nuclear power facilities, that have fluid pipeline sections butt-welded to the valve body.

DETAILED DESCRIPTION

Figure 1:
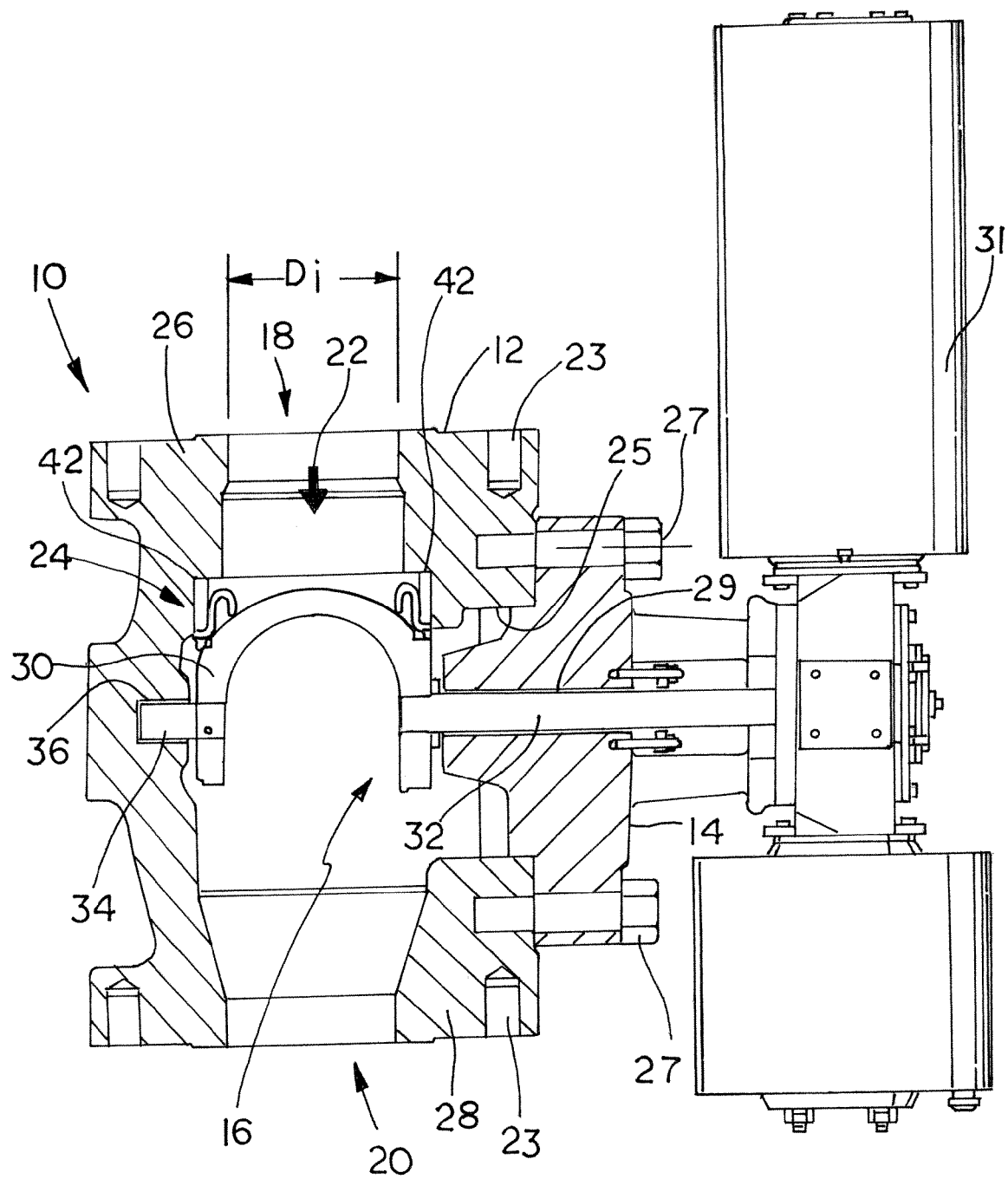
FIG. 1 is a cross-sectional view of a rotary ball valve and an actuator constructed in accordance with the teachings of the disclosure.
Figure 2:
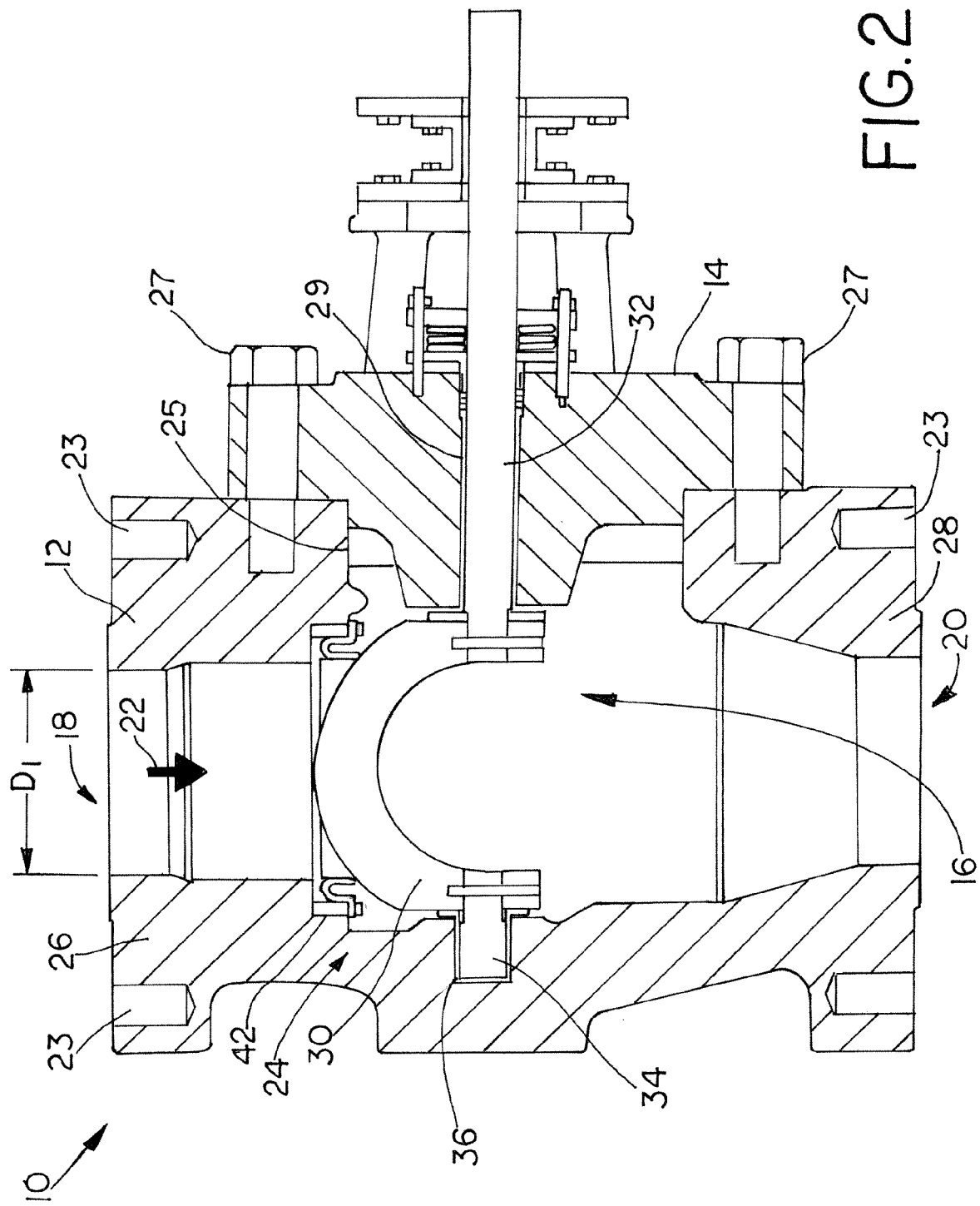
FIG. 2 is a close up view of the ball valve and control assembly of FIG. 1.

FIGS. 1 and 2 depict a rotary ball valve 10 constructed in accordance with the teachings of the disclosure, and generally including a valve body 12, a bonnet 14, a control assembly 16, and a seal assembly 24. The valve body 12 has generally cylindrical shape and includes an inlet portion 18, an outlet portion 20, a primary flow path 22, and a bonnet opening 25. As indicated by the arrow, the primary flow path 22 extends from the inlet portion 18 to the outlet portion 20. The inlet portion 18 is surrounded by an inlet flange 26. The outlet portion 20 is surrounded by an outlet flange 28. The inlet flange 26 and the outlet flange 28 may couple the ball valve 10 into segments of a process control pipeline by bolting, welding, clamping, any combination thereof, or any other known means. In the embodiment shown in FIGS. 1 and 2, the inlet flange 26 and outlet flange 28 include bores 23 for receiving fasteners that may be used to attach a section of the process control pipeline to the ball valve 10. As discussed above, in some cases, sections of the process control pipeline may be attached to the ball valve 10 via welds in lieu of fasteners.

The bonnet 14 includes a generally cylindrical structure bolted into the bonnet opening 25 of the valve body 12 with a plurality of bonnet bolts 27. The bonnet 14 defines a through-bore 29 that supports various components of the control assembly 16, as is generally known. The control assembly 16 includes a ball element 30, a drive shaft 32, and a support shaft 34. The drive shaft 32 is disposed through the through-bore 29 in the bonnet 14 and is adapted to be coupled to a rotary actuator 31 in a known manner. The support shaft 34 is disposed within a blind bore 36 formed in a wall of the valve body 12 that is opposite the bonnet opening 25. The through-bore 29 in the bonnet 14 and the blind bore 36 in the valve body 12 may include bearings as is known in the art to facilitate consistent unencumbered rotational displacement of the shafts 32, 34 and, therefore, the ball element 30 during operation of the ball valve 10. In the disclosed embodiment, the ball element 30 may include a cammed ball element, as is known in the art, to facilitate a repeatable seal with the seal assembly 24 when in the closed position, as shown in FIG. 1.

The seal assembly 24 is mounted in the valve body 12 at an interior location that is downstream from the inlet portion 18, and adjacent to the bonnet opening 25. So configured, when the seal assembly 24 requires replacement, the bonnet 14 and control assembly 16 may be removed from the valve body 12, and the seal assembly 24 may be removed and/or loaded through the bonnet opening 25. In accordance with the disclosed example, this arrangement eliminates the need to remove pipeline sections from the inlet flange 26 of the valve 10 to replace the seal assembly 24, which is highly advantageous when the valve 10 positioned in a system having pipeline sections that are butt-welded to the inlet flange 26 and/or outlet flange 28, such as in nuclear power production facilities, for example.

To accommodate the seal assembly 24, the disclosed embodiment of the valve body 12 defines an internal recess 42 disposed downstream from the inlet portion 18 of the valve body 12. Said another way, the internal recess 42 is disposed between the inlet portion 18 of the valve body 12 and the ball element 30 of the control assembly 16. The internal recess 42 of the disclosed embodiment is generally annular in shape and may have a stepped profile defined by internal surfaces of the valve body 12. In one embodiment (shown in FIGS. 4, 7, and 8), the recess 42 may include first and second cylindrical surfaces 38a, 38b, and first and second axial surfaces 40a, 40b.

The first cylindrical surface 38a may be disposed between the inlet portion 18 of the valve body 12 and the second cylindrical surface 38b, when considered relative to the flow path 22 depicted in FIG. 1. Similarly, the first axial surface 40a may be disposed between the inlet portion 18 of the valve body 12 and the second axial surface 40b, when considered relative to the direction of the flow path 22 depicted in FIG. 1.

Moreover, as illustrated, the second cylindrical surface 38b has a diameter Db that is larger than a diameter Da of the first cylindrical surface 38a. The first and second diameters Da, Db are each larger than an inlet diameter Di of the inlet portion 18 of the valve body 12.

With the valve body 12 so configured, the seal assembly 24 is mounted in the valve 10 through the bonnet opening 25, as mentioned above, thereby enabling the valve to be used in environments that require the inlet and outlet flanges 26, 28 to be butt-welded in-line, as opposed to bolted in-line configurations, such as environments in nuclear power facilities and other hazardous environments where preventing pipeline leaks is a priority. Of course, this design could also be used with bolted valve bodies, or otherwise. Moreover, the seal assembly 24 of the disclosed embodiment is disposed in the internal recess 42 such that when the ball element 30 is closed, as shown in FIG. 1, the seal assembly 24 is completely disposed between the ball element 30 and the inlet portion 18 of the valve body 12. As such, any force applied to the seal assembly 24 by the ball element 30 in the axial direction (i.e., opposite to the direction of the flow path 22) is resisted by the valve body 12 and, in one disclosed embodiment, by the first and/or second axial surfaces 40a, 40b of the internal recess 42 of the valve body 12. While the internal recess 42 of the valve body 12 depicted in FIG. 1 has been described as including a stepped profile defined by two internal cylindrical surfaces 38a, 38b and two axial surfaces 40a, 40b, alternative embodiments of the present disclosure can have more or less than two internal cylindrical surfaces and two axial surfaces depending, for example, on the specific design of the seal assembly 24 and/or other considerations. For example, the embodiment illustrated in FIGS. 3, 5, and 6 includes only one internal cylindrical surface 38 and one axial surface 40.

Figure 3:
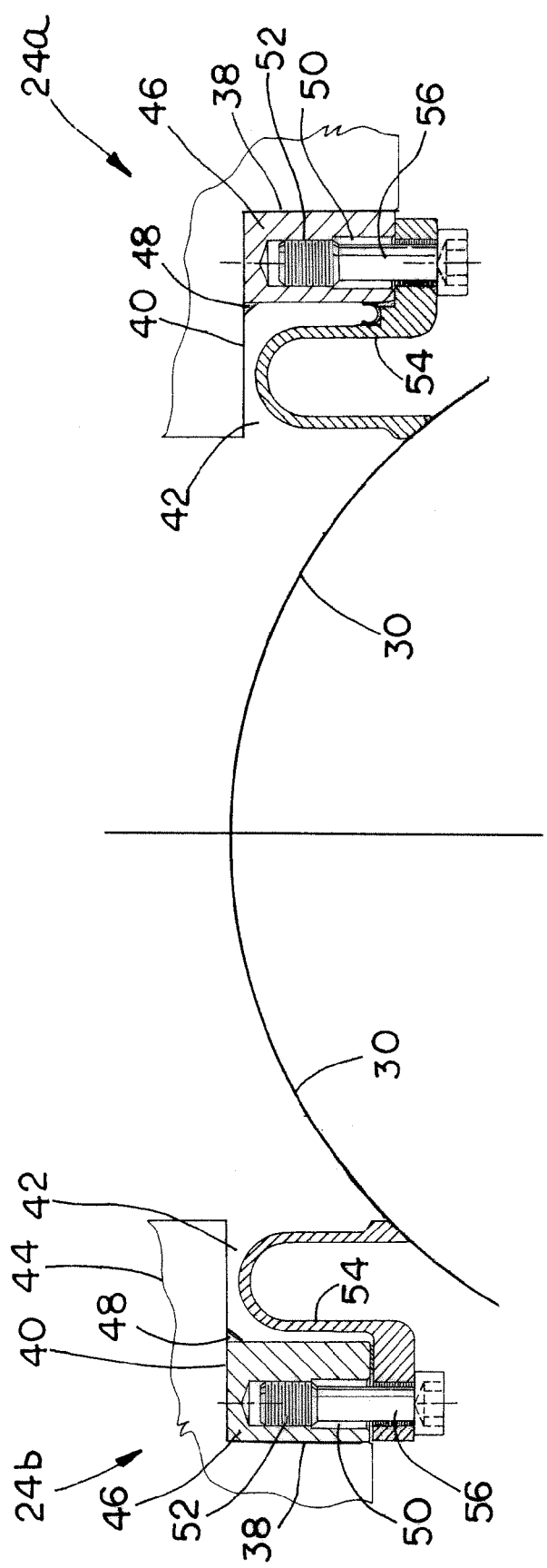
FIG. 3 is an enlarged fragmentary cross-sectional view of a flexible seal assembly constructed in accordance with the teachings of the disclosure, illustrating a first embodiment of the flexible seal assembly on the right side of FIG. 3 and a second embodiment of the flexible seal assembly on the left side of FIG. 3.

FIG. 3 illustrates two embodiments of flexible ball valve seal assemblies 24a, 24b constructed in accordance with the teachings of the disclosure. In each case, the flexible ball valve seal assembly 24 is located in the internal recess 42 in the valve body 12. The internal recess 42 defines an overhang or ledge 44 and the flexible ball valve seal assemblies 24a, 24b are located between the ledge 44 and the ball element 30. An anchor ring 46 is disposed between the ledge 44 and the ball element 30, the anchor ring 46 having one side located adjacent to the cylindrical surface 38. The anchor ring 46 secures the remaining flexible seal assembly elements in the internal recess 42. The anchor ring 46 may be secured in the internal recess 42 via a weld 48, for example. In other embodiments, the anchor ring 46 may be secured in the internal recess 42 via an interference fit, threads, fasteners, glue, or any other means of securing one element to another. The anchor ring 46 forms an anchor for the seal assembly 24a, 24b.

The anchor ring 46 has a generally rectangular cross-sectional shape as shown in FIG. 3. However, the anchor ring 46 may have virtually any cross-sectional shape, such as circular, oval, irregular, square, triangular, any polygonal shape, or virtually any other shape that complements the internal recess 42. The anchor ring 46 includes one or more counter bores 50 that include internal threads 52 along at least a portion of the counter bore 50. A flexible seal member 54 is attached to the anchor ring 46 with one or more captive screws 56. Thus, the flexible seal member 54 is secured to the anchor ring 46 and generally within the internal recess 42.

Figure 5:
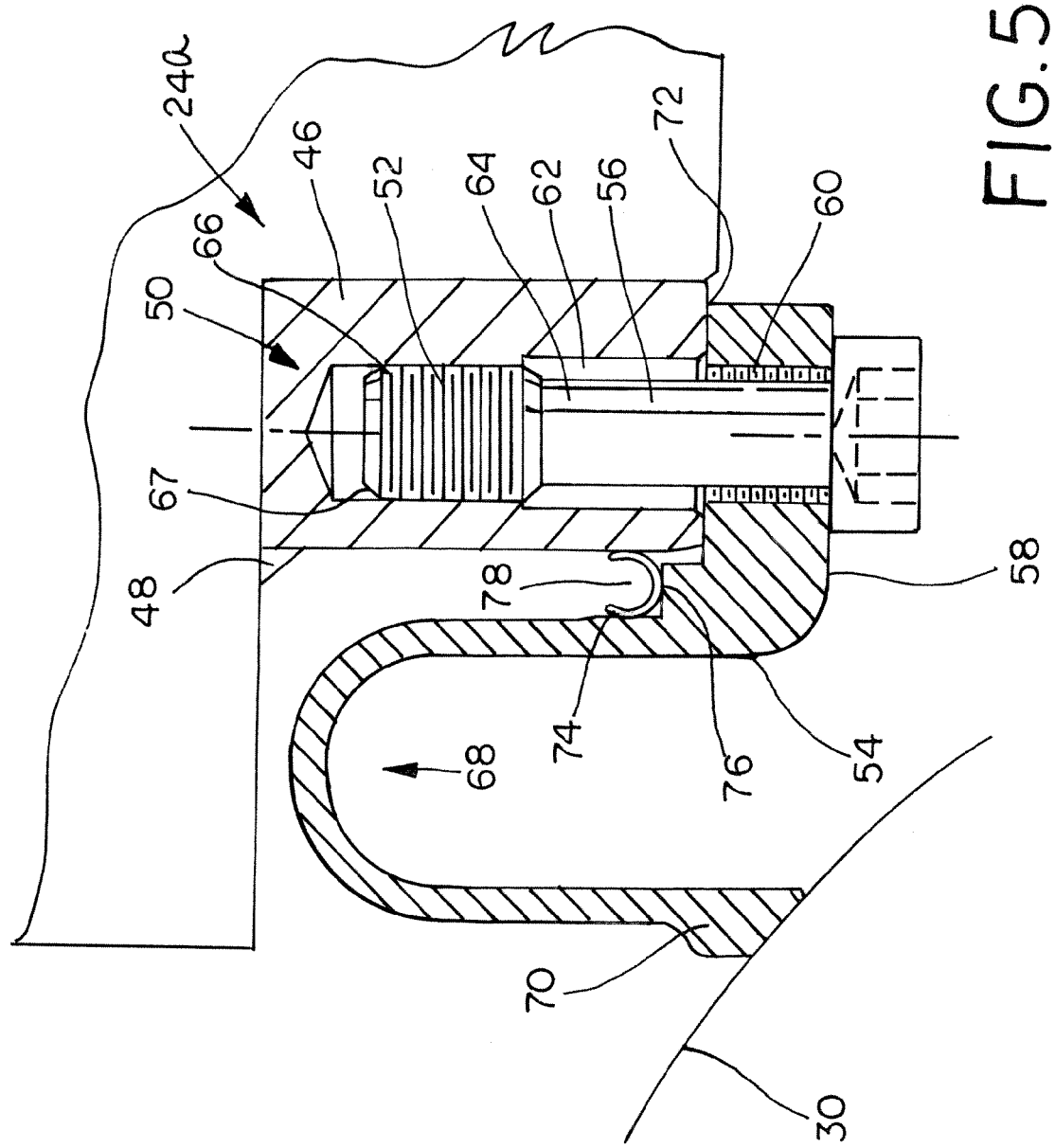
FIG. 5 is a further enlarged cross-sectional view of the first embodiment of the flexible seal assembly of the right side of FIG. 3.
Figure 6:
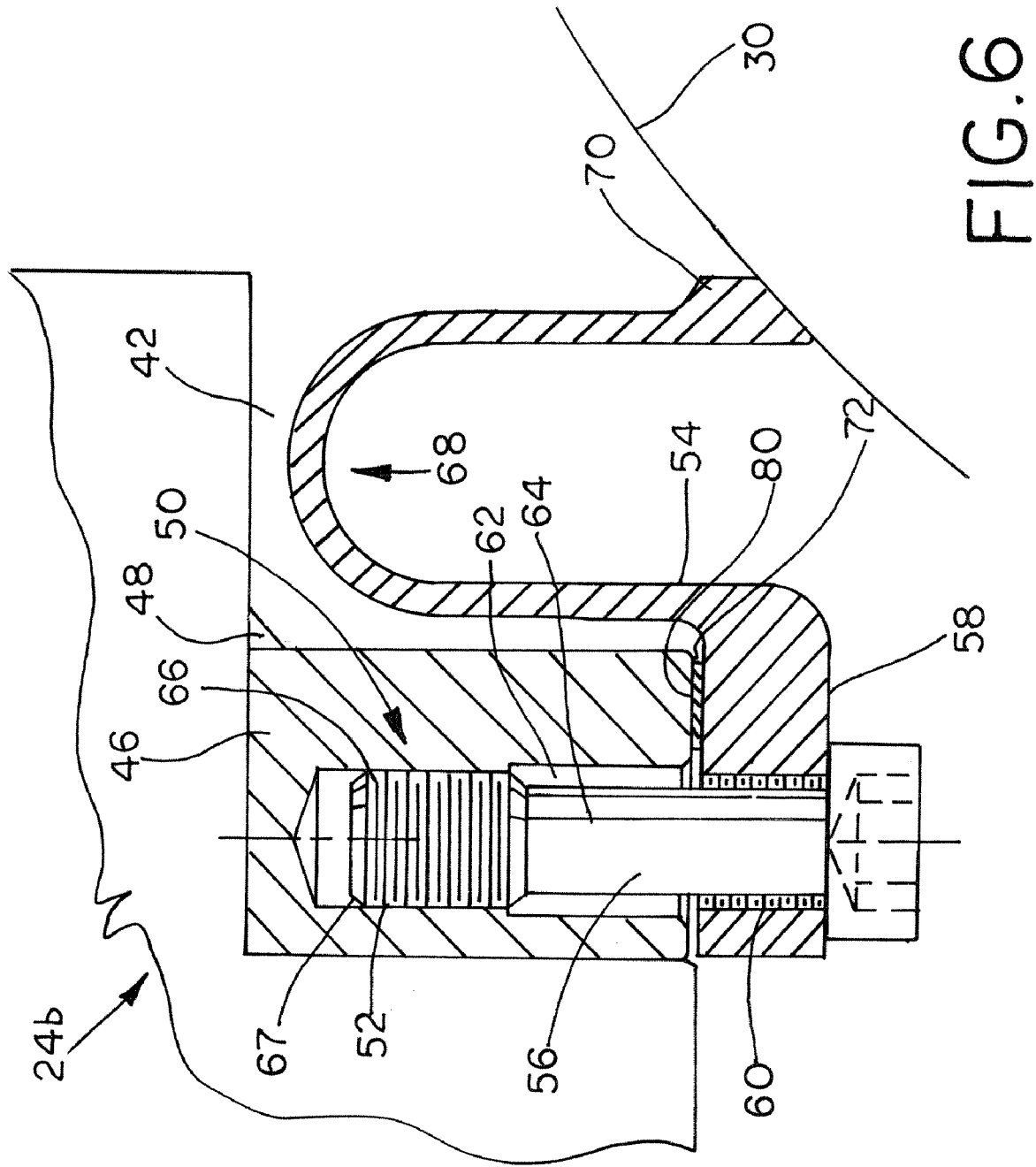
FIG. 6 is a further enlarged cross-sectional view of the second embodiment of the flexible seal assembly of the left side of FIG. 3.

Referring now to FIGS. 5 and 6, the seal assemblies 24a, 24b are illustrated. Each seal assembly 24a, 24b includes the anchor ring 46, the flexible seal member 54 and the one or more captive screws 56. The flexible seal member 54 forms a dynamic seal within the primary flow path 22 and may include a flange portion 58. The flange portion 58 may include one or more threaded flange openings 60. The counter bores 50, on the other hand, include the threaded portion 52 and an unthreaded portion 62. The captive screws 56 include an undercut portion 64, which is unthreaded, and a threaded end portion 66, which may include a chamfered lead in surface 67. During assembly, the threaded end portion 66 of the captive screws 56 may be threaded through the threaded flange openings 60. Centering of the captive screws 56 may be aided by the chamfered lead in surface 67, which may assist in alignment of each captive screw 56 in a respective threaded flange opening 60. After passing through the threaded flange opening 60, the threaded end portion 66 freely passes through the unthreaded portion 62 of a respective counter bore 50 and into the threaded portion 52 of the respective counter bore 50. The counter bores 50 are relatively deep to aid in centering of the captive screws 56. This arrangement advantageously forms a safety catch mechanism for the captive screws 56. For example, during operation of the valve 10, the seal assembly 24a, 24b may be subject to vibration due to fluid passing through the valve 10, vibration of the ball element 30, etc. As a result, the captive screws 56 may loosen and the threaded end portion 66 may eventually disengage from the threaded portion 52 of the counter bores 50. However, the captive screws 56 will remain retained in the counter bores 50 due to the threaded flange openings 60, through which the threaded end portions 66 will not pass due to vibration only. Thus, the disclosed seal assemblies 24a, 24b prevent loss of the captive screws 56 due to vibration, and damage that may be caused if the captive screws 56 were to become dislodged and flow downstream.

Each of the flexible seal members 54 also may include a convoluted or curved portion 68 attached to the flange 58 by a first leg. Additionally, each of the flexible seal members 54 may include a thickened contact end 70, which forms a sealing surface, the thickened contact end 70 may be connected to the curved portion 68 by a second leg. The thickened contact end 70 abuts the ball element 30 when the ball element is in the closed position (as shown in FIGS. 5 and 6). The thickened contact end 70 is thicker than the convoluted or curved portion 68, due to the wear and tear inflicted on the flexible seal member 54 from repeated closing of the ball element 30 during operation of the valve 10. More material in the thickened contact end 70 extends the lifespan of the flexible seal member 54. Alternatively, the thickened contact end 70 may be formed of a harder material than the rest of the flexible seal member 54, such as S44004 (440C) or R30006 (Alloy 6), or the thickened contact end 70 may be covered with a hard material, such as a CoCr-A weld overlay (Alloy 6 hard facing). Additionally, the thickened contact end 70 is better able to resist fluid pressure buildup on the upstream side of the seal point, due to the extended seal surface created by the thickened contact end 70.

The convolution or curved portion 68 of the flexible seal member 54 gives the seal assemblies 24a, 24b both an axial and a radial adjustment capability. For example, the flexible seal member 54 may flex upward (i.e., axially) in FIGS. 5 and 6 to accommodate ball element 30 misalignment in the axial direction. Similarly, the flexible seal member 54 may flex left or right (i.e., radially) in FIGS. 5 and 6 to accommodate ball element 30 misalignment in the radial direction. As a result, the seal assemblies 24a, 24b illustrated in FIGS. 5 and 6 have a self adjusting capability.

At the intersection between the flexible seal member 54 and the anchor ring 46 a secondary flow path 72 is formed, which must be sealed. In the embodiment illustrated in FIG. 5, the secondary flow path 72 is sealed with a c-seal 74. The c-seal 74 is disposed between the flexible seal member 54 and the anchor ring 46 and the c-seal 74 may rest upon an annular shelf 76 formed in the flexible seal member 54. The c-seal 74 includes an opening 78 that is oriented towards the inlet 18 (not shown in FIG. 5). Incoming fluid pressure biases the c-seal 74 outward, thus sealing the secondary flow path 72 between the flexible seal member 54 and the anchor ring 46.

FIG. 6 illustrates an alternative embodiment including a gasket 80 disposed between the flexible seal member 54 and the anchor ring 46. The gasket 80 may be bonded to the flange portion 58, or otherwise attached to the flange portion 58. Moreover, the gasket 80 may be integrally formed with the flange portion 58, or the gasket 80 may be separated and unbonded to the flange portion 58. Regardless, the gasket 80 forms a static seal in the secondary flow path 72.

The flexible seal member 54 is flexible enough to accommodate ball element 30 misalignments as discussed above, while having enough rigidity to withstand fluid pressures within the flow path 22. The flexible seal member 54 may be formed of a single, unitary piece of material. Alternatively, the flexible seal member 54 may be formed of one or more separate pieces of material that are welded together, or otherwise attached to one another.

Figure 4:
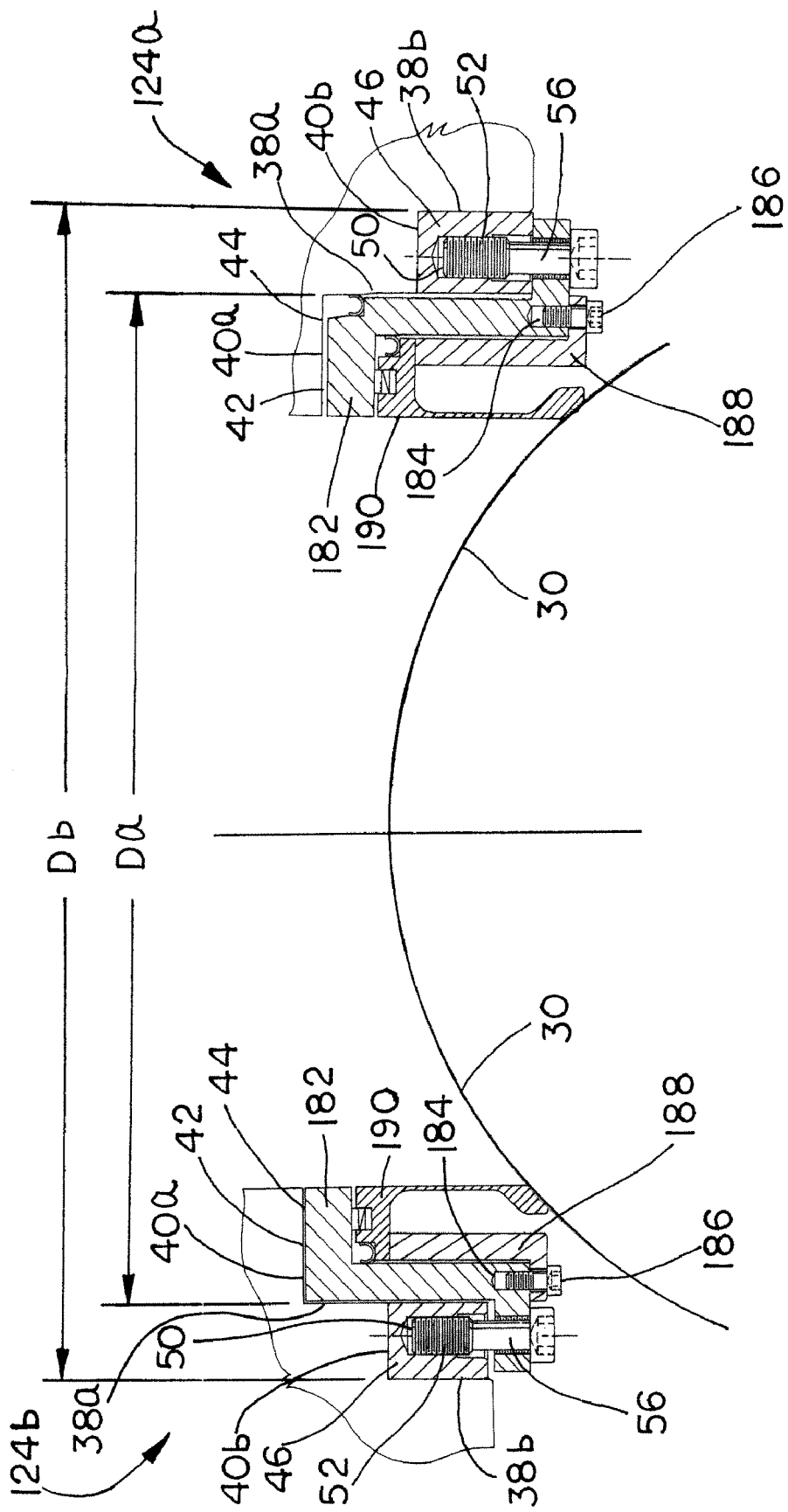
FIG. 4 is another enlarged fragmentary cross-sectional view of a rigid seal assembly with a flexible support constructed in accordance with the teachings of the disclosure, illustrating a first embodiment of the rigid seal assembly on the right side of FIG. 4 and a second embodiment of the rigid seal assembly on the left side of FIG. 4.

FIG. 4 illustrates two alternative embodiments of rigid ball valve seal assemblies 124a, 124b constructed in accordance with the teachings of the disclosure. In each case, the rigid ball valve seal assembly 124a, 124b is located in the internal recess 42 in the valve body 12. The rigid ball valve seal assemblies 124a, 124b are located between the ledge 44 and the ball element 30. The anchor ring 46 is disposed between the ledge 44 and the ball element, the anchor ring 46 having one side located adjacent to the second cylindrical surface 38b. The anchor ring 46 secures the remaining rigid seal assembly elements in the internal recess 42. The anchor ring 46 may be secured in the internal recess 42 via a weld, for example. In other embodiments, the anchor ring 46 may be secured in the internal recess 42 via an interference fit, threads, fasteners, adhesive, or any other means of securing one element to another. The anchor ring 46 forms an anchor for the seal assembly 124a, 124b.

The anchor ring 46 has a generally rectangular cross-sectional shape as shown in FIG. 4. However, the anchor ring 46 may have virtually any cross-sectional shape, such as circular, oval, irregular, square, triangular, any polygonal shape, or virtually any other shape that complements the internal recess 42. The anchor ring 46 includes one or more counter bores 50 that include internal threads 52 along at least a portion of each respective counter bore 50. A seal carrier 182 is attached to the anchor ring 46 with one or more captive screws 56. Thus, the seal carrier 182 is secured to the anchor ring 46 and generally within the internal recess 42. The seal carrier 182, in turn, includes one or more counter bores 184 (see FIGS. 7 and 8), each of which may receive a cap screw 186 to attach a seal retainer 188 to the seal carrier 182. A rigid seal ring 190 is held between the seal retainer 188 and the seal carrier 182.

Figure 7:
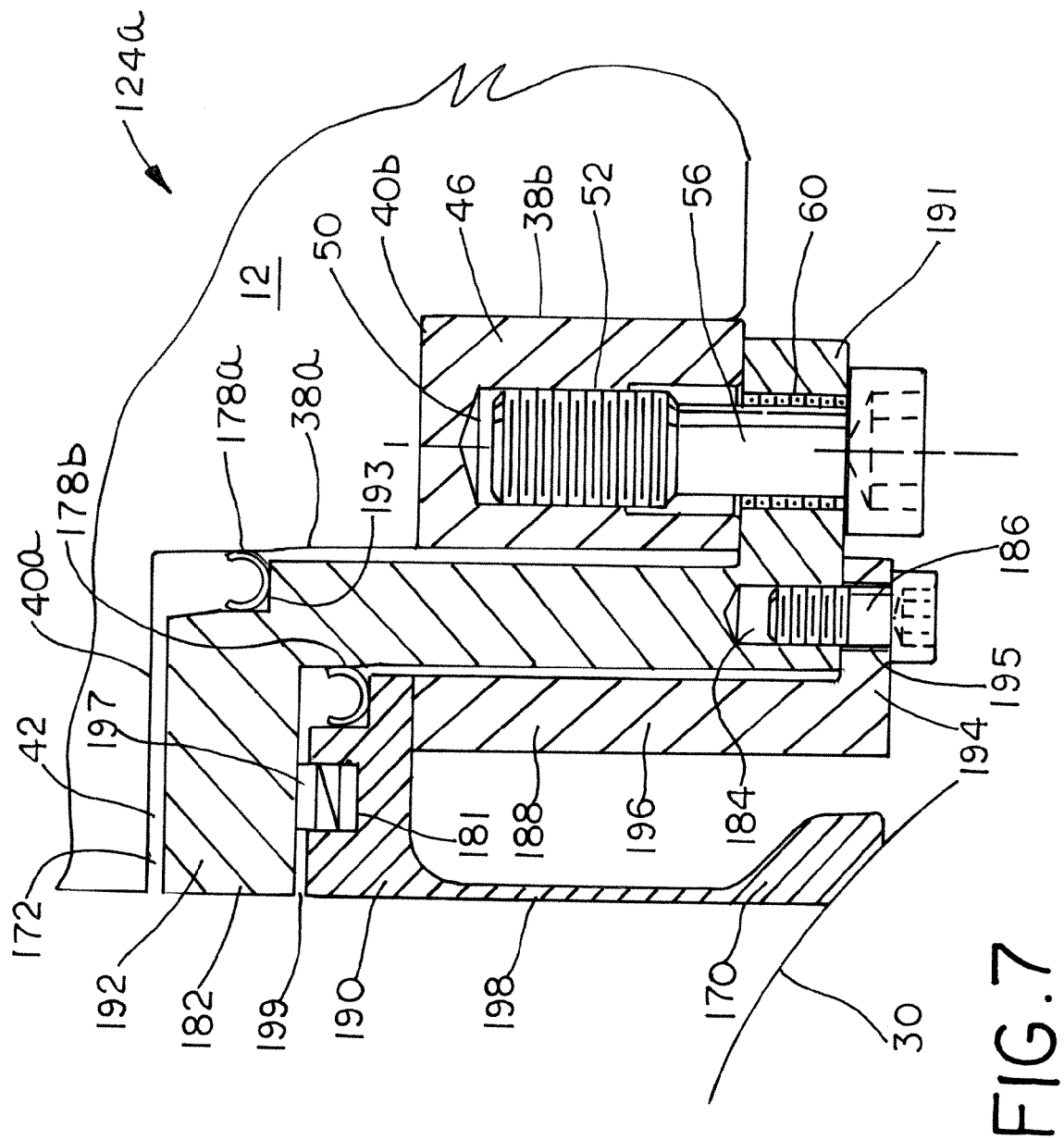
FIG. 7 is a further enlarged cross-sectional view of the first embodiment of the rigid seal assembly of the right side of FIG. 4.
Figure 8:
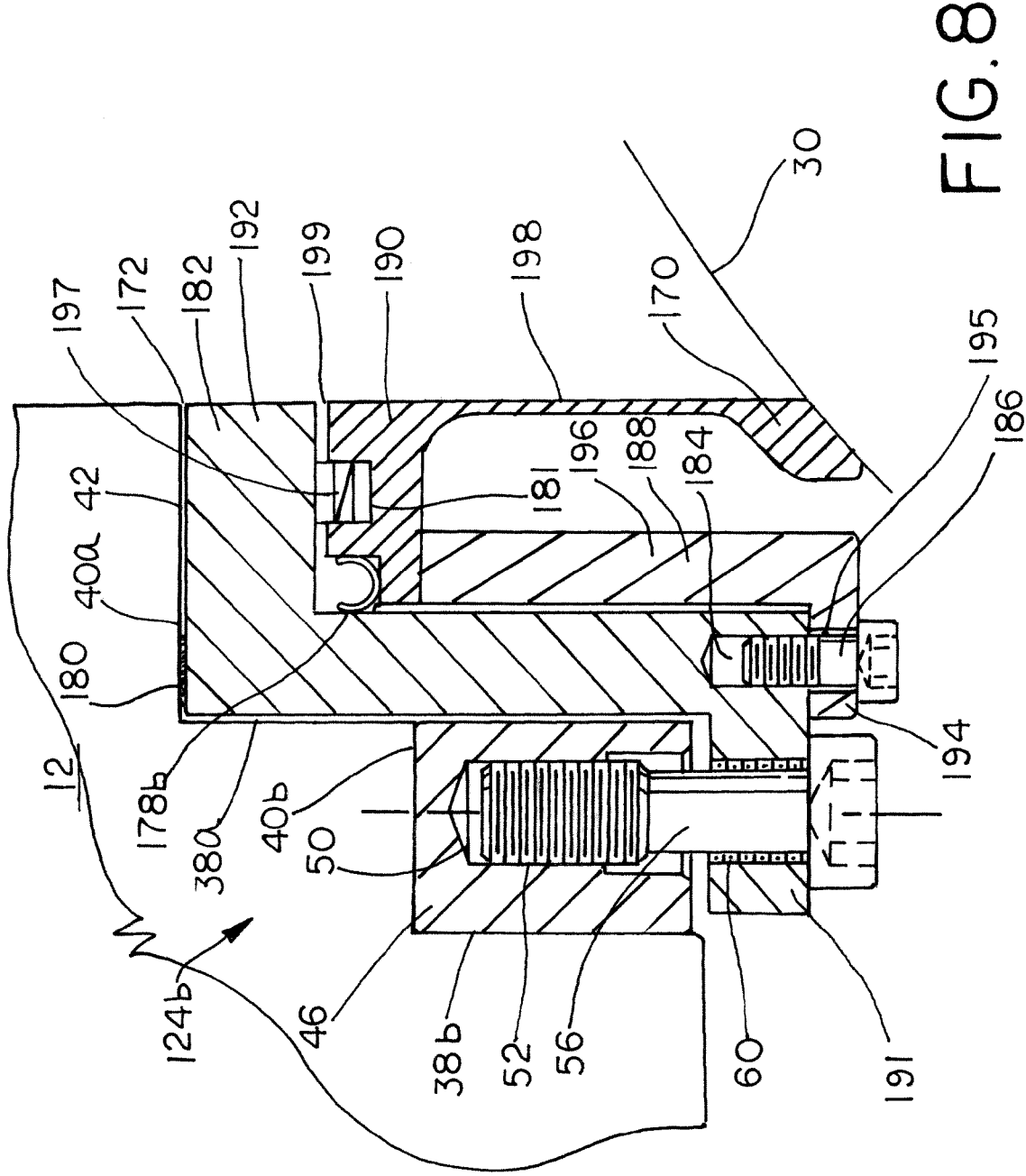
FIG. 8 is a further enlarged cross-sectional view of the second embodiment of the rigid seal assembly of the left side of FIG. 4.

Turning now to FIGS. 7 and 8, the seal assemblies 124a, 124b are illustrated. Each seal assembly 124a, 124b includes the anchor ring 46, the rigid seal member 190, the seal carrier 182, the seal retainer 188, the cap screws 186, and the captive screws 56. The rigid seal member 190 forms a dynamic seal within the primary flow path 22 and, in each case, may include a narrowed portion 198 connected to a thickened end portion 170 and a base. The narrowed portion 198 of the rigid seal member 190 provides limited radial flexibility, which allows the rigid seal member 190 to accommodate misalignments in the ball element 30, while the thickened end portion 170 resists the wear and tear of sealing operations. The rigid seal member 190 is held by the base between the seal retainer 188 and the seal carrier 182 and the rigid seal member 190 is biased axially by a biasing element, such as a wave spring 197. The wave spring 197 may be calibrated to provide a controlled amount of seat load to be exerted by the rigid seal ring 190 against the ball element 30 when the ball element is in the closed position.

The seal carrier 182 includes one or more threaded openings 60 in a first flange 191 thereof, which retains the captive screws 56 in the counter bores 50 of the anchor ring 46. A second flange 192 in the seal carrier 182 is disposed opposite the first flange 191, proximate the second axial surface 40a. The first flange 191 also includes the one or more counter bores 184, which receive the cap screws 186. The cap screws 186 extend through openings 195 in a flange 194 of the seal retainer 188, and into the counter bores 184 of the first flange of the seal carrier 182, thereby securing the seal retainer 188 to the seal carrier 182, and thus securing the seal retainer 188 to the anchor ring 46. The seal retainer 188 includes an elongated portion 196 opposite the flange 194. The elongated portion 196 of the seal retainer 188 and the second flange 192 of the seal carrier 182 cooperate to retain the rigid seal ring 190. The rigid seal ring 190 is biased towards the ball element 30 by the wave spring 197, which is retained in a channel 181 disposed in a surface of the rigid seal ring adjacent the second flange 192 of the seal carrier. The rigid seal ring 190 is limited in axial movement towards the ball element 30 by the elongated portion 196 of the seal retainer 188.

Similar to the embodiments shown in FIGS. 5 and 6, a secondary flow path 172 is formed between the anchor ring 46 and the seal carrier 182. The secondary flow path 172 is sealed in one embodiment (FIG. 7) by a first, static c-seal 178a, which rests on an annular ledge 193 formed in the flange portion 192 of the seal carrier 182 adjacent the first cylindrical surface 38a. The first c-seal 178a includes an opening directed towards the inlet 18 (not shown in FIG. 7). Thus, when the ball element 30 is in the closed position, fluid pressure enters the opening in the first c-seal 178a and forces the c-seal against the seal carrier 182 on one side and against the valve body 12 on another side. Thus, the first c-seal 178a seals the secondary flow path 172. Additionally, the first c-seal 178a centers the seal carrier 182 with respect to a centerline of the valve body 12.

Similarly, a tertiary flow path 199 is formed between the rigid seal ring 190 and the seal carrier 182. The tertiary flow path 199 is sealed by a second, dynamic c-seal 178b in the same manner that the first c-seal 178a seals the secondary flow path 172. The second c-seal 178b rests in an annular shelf formed in the base of the rigid seal ring 190 proximate the seal carrier 182. In the embodiment shown in FIG. 7, the wave spring 197 is upstream of the second c-seal 178b in the tertiary flow path 199. However, in other embodiments, the wave spring 197 may be located downstream of the second c-seal 178b and/or in a channel in the seal retainer 188. The second c-seal 178b allows the rigid seal ring 190 to move in the axial direction, while maintaining a seal within the tertiary flow path 199.

In another embodiment, as illustrated in FIG. 8, the secondary flow path 172 may be sealed by a gasket 180 located between the second flange 192 of the seal carrier 182 and the valve body 12. The gasket 180 is bonded to the seal carrier 182 in the embodiment of FIG. 8. However, the gasket 180 may be formed integrally with the seal carrier 182, or the gasket 180 may be a separate and unbonded element in other embodiments.

Figure 9:
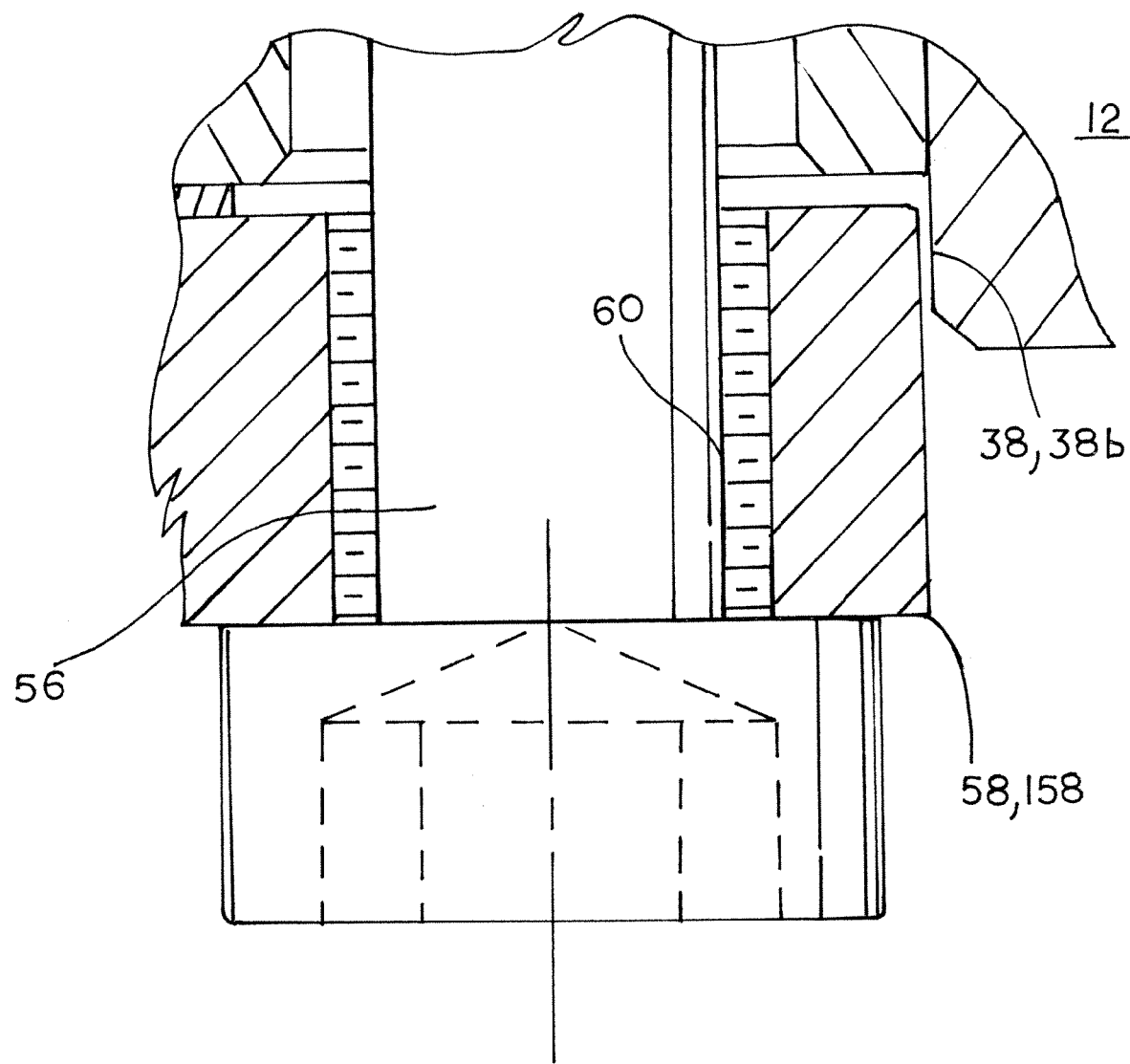
FIG. 9 is a close up cross-sectional view of a captive screw and a seal flexure of the flexible seal assemblies of FIG. 3.

During installation, the seal assembly 24a, 24b, 124a, 124b may be aligned within the internal recess 42 by guiding an outside surface of the flange portion 58, 158 against the cylindrical surface 38, 38b, as shown in FIG. 9. This method of aligning the seal assembly 24a, 24b, 124a, 124b advantageously does not require direct line of sight, or fine motor skills to accomplish. Thus, an operator wearing a radiation suit, or other bulky suit, can easily and quickly align the seal assembly 24a, 24b, 124a, 124b, within the internal recess 42.

Referring again to FIGS. 1-4, a typical installation sequence will be described. The first step in replacing (or installing) a seal assembly is to remove the bonnet 14 from the valve body 12. The bolts 27 are removed from the bonnet 14 and then the bonnet is removed from the bonnet opening 25, thereby exposing the bonnet opening and the inside of the valve body. The anchor ring 46 is inserted into the internal recess 42 in the valve housing through the bonnet opening 25. Control assembly 16 elements may be removed if needed for better access to the internal recess 42. After the anchor ring 46 is placed in the internal recess 42, the anchor ring may be secured to the valve body with a weld, or other attachment mechanism. An additional seal assembly component, such as the flexible seal member 54 (FIG. 3) or the seal carrier 182 (FIG. 4) may be inserted through the bonnet opening 25 and attached to the anchor ring 46 with one or more captive screws 56. The captive screws 56 are inserted through respective threaded openings 60 in the additional seal assembly component and into respective bores 50 in the anchor ring 46. In some embodiments, such as the rigid seal ring embodiments illustrated in FIG. 4, remaining seal assembly components, such as the seal retainer 188 and the rigid seal ring 190 may be attached sequentially. After all seal assembly components are secured, the control assembly components may be reinstalled if needed and the bonnet 14 may be secured to the valve body 12.

In accordance with the disclosed examples, the seal assembly can be replaced without removal of the ball valve from the fluid pipeline. Thus, the disclosed examples may offer an advantage over some prior art valves that included seal assemblies that were inserted through the fluid inlet, which required disconnecting the ball valve from the fluid pipeline.

Although the seal assembly is disclosed as being used in a rotary ball valve having pipeline sections butt-welded to the valve body, the seal assembly may be used in virtually any type of ball valve. For example, the seal assembly may be used in ball valves having pipeline sections bolted, or otherwise removably attached, to the valve body. Other than the advantage of being installable through a bonnet opening in the valve body, the disclosed seal assemblies advantageously provide both axial and radial automatic adjustment capabilities to compensate for misaligned ball elements.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed:

1. A method of installing a seal assembly in a rotary ball valve having a valve body including a fluid inlet and a fluid outlet, and a removable bonnet attached to a bonnet opening in the valve housing, the method comprising:
    inserting an anchor ring through the bonnet opening and into the valve body;
    positioning the anchor ring in an internal recess in the valve body;
    securing the anchor ring in the internal recess;
    inserting an additional seal assembly component through the bonnet opening and into the valve body proximate the anchor ring;
    securing the additional seal assembly component to the anchor ring by inserting one or more captive screws through respective threaded openings in the additional seal assembly component and into respective bores each having a threaded and unthreaded portion in the anchor ring; and
    installing the removable bonnet on the bonnet opening.

2. The method of claim 1, wherein the additional seal assembly component is a flexible seal member, the flexible seal member including a flange, a curved portion, and a thickened end portion, the flange of the flexible seal member including the respective threaded openings.

3. The method of claim 1, wherein the additional seal assembly component is a seal carrier, the seal carrier including a first flange and a second flange, the first flange of the seal carrier including the respective threaded openings.

4. A seal assembly for a rotary ball valve, the seal assembly comprising:
an anchor ring, the anchor ring having one or more bores with respective threaded portion and unthreaded portions;
a seal component having a first flange, the first flange including one or more threaded openings; and
one or more captive screws,
wherein at least one captive screw secures the seal component to the anchor ring, a portion of the at least one captive screw extending through a respective threaded opening in the flange and into a respective bore.

5. The seal assembly of claim 4, wherein the seal component is a flexible seal member having a curved portion and a thickened end portion.

6. The seal assembly of claim 5, further comprising a gasket disposed between the flexible seal member and the anchor ring.

7. The seal assembly of claim 5, further comprising a c-seal disposed between the flexible seal member and the anchor ring.

8. The seal assembly of claim 7, wherein the c-seal includes an opening oriented towards the fluid inlet.

9. The seal assembly of claim 4, wherein the seal component is a seal carrier, the seal carrier including a second flange positioned distal to the first flange, the first flange including one or more bores.

10. The seal assembly of claim 9, further comprising a seal retainer, the seal retainer having a flange and an elongated portion,
wherein the flange of the seal carrier includes one or more openings, and the seal retainer is attached to the seal carrier by one or more cap screws that extend through respective openings in the flange of the seal retainer and into respective bores of the seal carrier.

11. The seal assembly of claim 10, further comprising a rigid seal ring, the rigid seal ring having a narrowed portion and a thickened end portion,
wherein the rigid seal ring is held between the elongated portion of the seal retainer and the second flange of the seal carrier.

12. The seal assembly of claim 11, further comprising a biasing member disposed between the rigid seal ring and the seal carrier, the biasing member biasing the rigid seal ring away from the second flange of the seal carrier.

13. The seal assembly of claim 12, further comprising a c-seal disposed between the rigid seal member and the second flange of the seal carrier, the c-seal resting in an annular shelf in the rigid seal member.

14. The seal assembly of claim 4, wherein the one or more captive screws include a threaded end portion and an unthreaded undercut portion.

15. The seal assembly of claim 14, wherein the bore in the anchor ring includes a threaded portion and an unthreaded portion,
wherein the one or more threaded openings in the flange and the respective bores form a captive screw retention device that prevents the captive screws from becoming dislodged from the bore.

16. A rotary ball valve comprising:
a valve body having a fluid inlet and a fluid outlet and an internal recess positioned between the fluid inlet and the fluid outlet, the internal recess having a larger diameter than a diameter of the fluid inlet;
a seal assembly comprising an anchor ring, the anchor ring having a bore with a threaded and unthreaded portion, the seal assembly being disposed within the internal recess; and
a rotatable ball element disposed within the valve body, the rotatable ball element being movable between an open position, spaced apart from the seal assembly, and a closed position adjacent the seal assembly;
wherein one element of the seal assembly includes a first flange, the first flange having a threaded opening and the one element of the seal assembly is attached to the anchor ring with a captive screw that extends through the threaded opening in the first flange and into the bore of the anchor ring.

17. The rotary ball valve of claim 16, wherein the one element of the seal assembly is a flexible seal member, the flexible seal member having a curved portion and a thickened end portion.

18. The rotary ball valve of claim 16, wherein the one element of the seal assembly is a seal carrier, the seal carrier having a second flange distal to the first flange.

19. The rotary ball valve of claim 18, wherein the seal assembly further comprises a seal retainer, the seal retainer having a flange with an opening and an elongated portion.

20. The rotary ball valve of claim 19, further comprising a rigid seal ring, the rigid seal ring including a narrowed portion and a thickened end portion, the narrowed portion providing limited flexibility in the radial direction.

* * * * *